S. P. STEVENS.
PEANUT DIGGER.
APPLICATION FILED JUNE 18, 1920.

1,383,580.

Patented July 5, 1921.

INVENTOR
S. P. Stevens.
By Jack A. Ashley
ATTORNEY

UNITED STATES PATENT OFFICE.

SHED P. STEVENS, OF BUFFALO, TEXAS.

PEANUT-DIGGER.

1,383,580.   Specification of Letters Patent.   Patented July 5, 1921.

Application filed June 18, 1920. Serial No. 389,828.

*To all whom it may concern:*

Be it known that I, SHED P. STEVENS, a citizen of the United States, residing at Buffalo, in the county of Leon and State of Texas, have invented certain new and useful Improvements in Peanut-Diggers, of which the following is a specification.

This invention relates to new and useful improvements in peanut diggers.

The aim of the invention is to provide a digger of a simple and superior nature which will be very simple to operate, and which will include a small number of parts and be inexpensive to construct.

In carrying out the invention I provide a curved frame having a general rectangular shape in elevation and arranged to be attached to a plow beam. The frame has provision at its lower end for the attachment of a shovel and a slide by means of a single bolt. Braces are also provided for fastening the frame in position.

Figure 1:
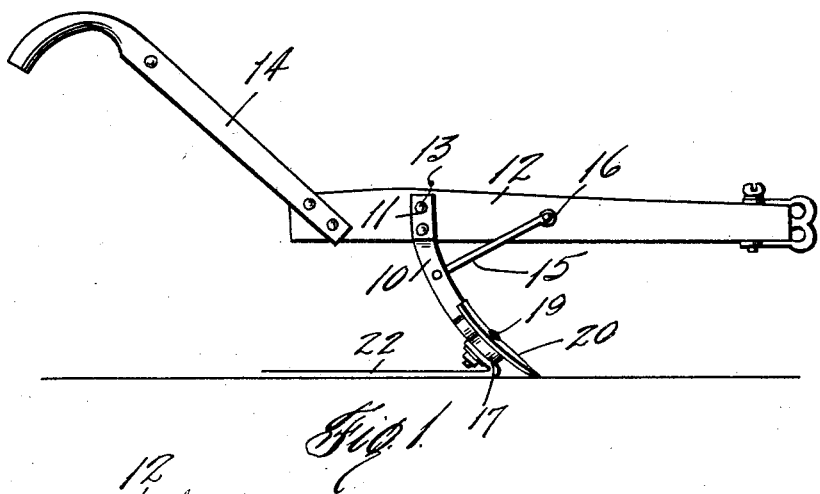
Figure 2:
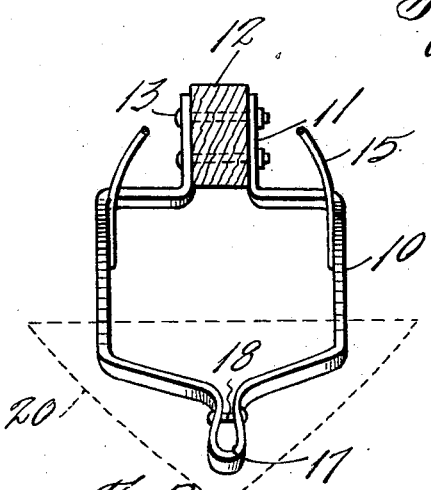
Figure 3:
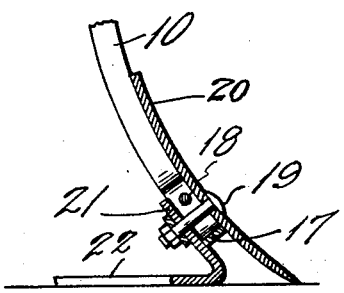
Figure 4:
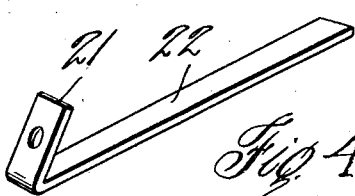

The invention will be more readily understood from a reading of the following specification and by reference to the accompanying drawings, in which an example of the invention is shown, and wherein:

Figure 1 is a side elevation of a device constructed in accordance with my invention, Fig. 2 is a front elevation of the digger frame or standard, the plow beam being shown in section and the plow shovel in dotted lines, Fig. 3 is a partial longitudinal sectional view, and Fig. 4 is a perspective view of the slide.

In the drawing the numeral 10 designates a rectangular standard which is curved downwardly as is clearly shown in the drawing. The standard is split at its upper end and provided with a pair of upwardly extending arms 11. The arms are positioned on each side of a plow beam 12 and secured thereto by transverse bolts 13. The beam 12 is provided at its rear ends with the usual handle construction 14.

From the upper portions of the sides of the standard, braces 15 extend forwardly and upwardly. The braces have their rear ends suitably fastened to the sides of the standard, while their forward ends are secured to the beam by a transverse bolt 16. The standard has its lower portion inclined downwardly toward the center and formed into a shank 17. The shank is formed by looping the metal of the standard and connecting the neck portion by a transverse rivet 18. This forms an eye through which a plow bolt 19 may be readily passed. A plow shovel 20 is fastened over the shank and the lower portion of the standard by means of the plow bolt 19. On the under side of the shank the upwardly inclined bracket 21 of a slide 22 is fastened by means of the same bolt 19. The slide 22 is in the form of a flat bar with the bracket 21 bent upwardly and rearwardly at its forward end as is best shown in Fig. 4. The slide extends rearwardly and acts to stabilize the digger and holds same in the row while in operation.

In using the digger it is drawn along the row like an ordinary plow. The shovel 20 digs into the ground and throws up the vines which pass through the standard 10 and fall in the furrow behind the digger. The vines are thus left in a convenient position to be gathered by means of a pitch fork or otherwise. Peanuts and the like may in this manner be easily and inexpensively harvested without loss and without necessity for stooping in gathering the vines as is generally the custom. The simple construction is not likely to get out of order and is quite inexpensive to produce. The curved and open standard 10 is peculiarly adapted for the result sought. The manner of forming the shank and its eye is a particular feature of the invention.

What I claim, is:

1. In a peanut digger, a beam, handles secured to the rear portion of the beam, a standard depending from the beam formed of a single bar bent upon itself between its ends forming a relatively narrow loop, said bar diverging upwardly from the top of the loop to form a frame having substantially parallel sides, said sides being arranged outwardly of the sides of the beam and having their upper ends bent inwardly and upwardly forming extensions engaging the sides of the beam, means for securing the extensions to the beam, diagonal braces connecting the sides of said frame and beam, a plow share extending upwardly and increasing in width upwardly and being relatively wide and contacting with the forward face of the sides of said frame, a slide arranged rearwardly of the standard and having an upstanding bracket engaging the rear side of said loop, and a bolt passing through the loop and connecting the plow share and bracket.

2. In a peanut digger, a beam, handles secured to the rear portion of the beam, a standard depending from the beam and embodying an open frame having sides arranged outwardly of the sides of the beam for a substantial distance, diagonal braces secured to the sides of the frame and beam, an upstanding relatively wide plow share contacting with the forward face of the sides of said frame and braced thereby, a slide arranged rearwardly of the frame, and means for securing the plow share and slide to the frame.

In testimony whereof I affix my signature.

SHED P. STEVENS.